United States Patent [19]

Ogita

[11] Patent Number: 4,467,229
[45] Date of Patent: Aug. 21, 1984

[54] ELECTRIC ROTARY MACHINERY OF SALIENT-POLE TYPE

[75] Inventor: Tadahisa Ogita, Yokohama, Japan

[73] Assignee: Tokyo Shibaura Denki Kabushiki Kaisha, Kawasaki, Japan

[21] Appl. No.: 400,587

[22] Filed: Jul. 21, 1982

[30] Foreign Application Priority Data

Aug. 14, 1981 [JP] Japan .................. 56-126630

[51] Int. Cl.$^3$ .................................................. H02K 9/04
[52] U.S. Cl. .................. 310/60 A; 310/64; 310/157; 310/269
[58] Field of Search ............ 310/60 A, 60, 61, 64, 310/65, 269, 62, 63, 157

[56] References Cited

U.S. PATENT DOCUMENTS

| | | | |
|---|---|---|---|
| 2,899,573 | 8/1959 | Wesolowski | 310/269 X |
| 2,974,239 | 3/1961 | Havelka et al. | 310/269 X |
| 3,588,557 | 6/1971 | Kilgore | 310/60 |
| 4,347,451 | 8/1982 | Mizuyama et al. | 310/60 A |

FOREIGN PATENT DOCUMENTS 203503  4/1966  Sweden .................. 310/60 A

Primary Examiner—Donovan F. Duggan
Attorney, Agent, or Firm—Oblon, Fisher, Spivak, McClelland & Maier

[57] ABSTRACT

An electric rotary machinery including a rotor of salient-pole type provided with salient magnetic poles to achieve a fan effect of driving air radially, the fan effect being limited by air flow limiting members attached to the rotor, a stator cooperating with the rotor, an air circulating passage through which air is circulated to cool both the rotor and stator, and electric fans. Cooling air is driven mainly by the electric fans.

4 Claims, 9 Drawing Figures

ELECTRIC ROTARY MACHINERY OF SALIENT-POLE TYPE

BACKGROUND OF THE INVENTION

The present invention relates to an electric rotary machinery, for example, a water-wheel generator-motor, of salient-pole type, in which ventilation cooling is employed.

The electric rotary machinery of salient-pole type such as water-wheel generator-motor has become larger and larger in capacity these days, and particularly the water-wheel generator-motor has the most remarkable tendency of its becoming higher in speed and larger in capacity so as to reduce the building cost of a power plant. In the case of this large-sized generator-motor, however, it is difficult that the amount of cooling air necessary to cool the generator-motor is obtained overcoming the flow resistance in a ventilating passage on the side of a stator, when only the centrifugal fan effect thanks to the rotation of a salient-pole type rotor is used. Therefore, ventilating ducts are arranged in a rotor rim to further enhance the centrifugal fan effect due to the rotor, or electric fans are additionally arranged to compensate the lack of cooling air.

FIG. 1 is a longitudinally-sectional view showing the ventilation cooling arrangement of a conventional vertical type generator-motor 10. A plurality of salient-poles or magnetic poles 16 are fixed on the outer circumference of a rotor rim 14 attached to a rotary shaft 12 of generator-motor 10, and cooling air or wind caused by the centrifugal fan effect due to the rotation of magnetic poles 16 axially enters into spaces 17 between magnetic poles 16, radially flows through stator air ducts 20 in a core 18 of a stator 42, cooling the stator core 18 and a stator coil 18a, then through an air cooler 24 attached to the outer circumference of a stator frame 22 into a space or outer circumferential air passage 10a between the generator-motor 10 and a pit wall 32, and finally enters as again-cooled air or wind into spaces 17 between magnetic poles 16. Cooling air or wind is thus circulated through the above-described passage or air circulating passage.

In the case where the cooling effect attained according to the above-described cooling system was not enough, rotor air ducts 26 were arranged in the rotor rim 14 to enhance the fan effect of rotor 28, and electric fans 30 were further added when it was thought necessary to increase the amount of cooling air or wind.

FIG. 2 is a graph showing the pressure-flow rate characteristic of cooling system attained by the generator-motor 10 shown in FIG. 1. The axis of abscissa represents the flow rate of cooling air when it is converted to one barometric pressure. The vertical axis of coordinates represents the difference between the pressure P of cooling air or pressure generated when the rotor is regarded as a blower, i.e. pressure just before air ducts 20 of stator core 18 and the pressure enclosing the rotor 28.

Curve Z in the graph represents the relation between the pressure applied to the flowing passage of cooling air and the flow rate and can be regarded as representing the flow resistance in the flowing passage. The flow resistance is determined by both the ventilation resistance in the air cooler 24 and the loss of air when it is curved flowing from the air cooler and entering into the inlet of rotor 28. A curve A is one of pressure-flow rate curves which show the characteristic of fan effect attained thanks to the projected pole of rotor 28. Curve A shows the most fundamental characteristic in the case where no rotor air duct 26 is provided in the rotor rim 14 and cooling air axially flows through spaces 17 between magnetic poles while radially flowing toward the stator core 18.

A point Pa where curves A and Z intersect denotes the working point of ventilating function attained by the salient poles. The flow rate is represented by $Q_0$ at this time. A curve B represents the relation between pressure and flow rate in a case where rotor air ducts 26 are provided in the rotor rim 14. The fan effect of rotor 28 is enhanced thanks to the presence of rotor air ducts 26 and a point Pb where curves B and Z intersect denotes the working point of ventilating function. The flow rate at the point Pb becomes equal to $Q_1$ which is larger than $Q_0$. A curve C represents the relation between pressure and flow rate in a case where an optional number of electric fans are arranged in addition to rotor air ducts 26 to increase the flow rate of cooling air, and a point Pc where curves C and Z intersect becomes the working point of ventilating function. The flow rate at this point becomes equal to $Q_2$ which is larger than $Q_1$.

Assuming that the desired flow rate is $Q_2$, power necessary to flow cooling air of flow rate $Q_2$ through the generator-motor which has characteristics represented by curves A and B will be calculated.

It can be found from FIG. 2 that the pressure which electric fans must bear to flow cooling air of flow rate $Q_2$ through the generator motor 10 which is provided with rotor air ducts 26 is $Pf_2$. It can be therefore understood that the power $Lf_2$ necessary to drive electric fans is denoted by the following equation:

$$Lf_2 = \frac{Pf_2 \cdot Q_2}{\eta}$$

where $\eta$ represents the efficiency of electric fans.

Similarly as apparent from FIG. 2, it can be understood that the pressure which electric fans must bear to flow cooling air of flow rate $Q_2$ through the generator motor 10 which has no rotor air duct 26 is $Pf_1$ and that the power $Lf_1$ necessary to drive electric fans is denoted by the following equation:

$$Lf_1 = \frac{Pf_1 \cdot Q_2}{\eta}$$

When these relations are considered with reference to FIG. 2, $Pf_2 < Pf_1$. Therefore, the larger flow rate $Q_2$ seems to naturally be obtained by smaller power when as many rotor air ducts 26 as possible are arranged to enhance the fan effect of rotor 28 and a further lack of flow rate is added by electric fans 30. Accordingly, the capacity of electric fans was conventionally determined according to this manner of consideration.

SUMMARY OF THE INVENTION

A object of the present invention is to provide an electric rotary machinery of a salient-pole type capable of achieving an efficiency higher than that of conventional ones and in which ventilation cooling is carried out while using electric fans.

The inventor of the present invention has found as the result of having practically measured the wind loss Lr caused by the rotor 28 itself that the wind loss was remarkably increased when rotor air ducts 26 were arranged to enhance the fan effect. Providing that the wind loss is $Lr_1$ in a case where desired flow rate $Q_2$ is achieved without arranging any rotor air duct 26 and that the wind loss is $Lr_2$ in a case where desired flow rate $Q_2$ is achieved with rotor air ducts 26 arranged, when total power losses, $L_1 = Lr_1 + Lf_1$ and $L_2 = Lr_2 + Lf_2$, resulting from adding the power of electric fans in each case to the wind loss of rotor 28 are compared with each other, it has been found that $L_1 < L_2$.

The present invention is originated from this fact and the object of present invention can be achieved by an electric rotary machinery of a salient-pole type in which the fan effect thanks to the salient-pole type rotor is kept low and electric fans having a large capacity are used.

There are various manners of keeping low the fan effect thanks to the salient-pole rotor. Some examples of them are to arrange plate-shaped members adjacent to the outer circumference of rotor and in the passage through which air or cooling air between magnetic poles 16 is flowed in the radial direction, so as to limit the flow of cooling air; to insert and arrange block-shaped limiting members in spaces between magnetic poles 17 and spaced from each other in the axial direction; and to wind belt-shaped limiting members around the outer circumference of rotor and spaced from each other in the axial direction, the limiting members being made of high tension fibers. These examples will be shown relating to the description of embodiments.

The salient-pole type generator-motor having such arrangement as described above enables cooling air to be circulated therein, limiting the fan operation of rotor which is not efficient to achieve the fan operation, but mainly using efficiently-designed electric fans, so that a high efficiency can be attained as a whole.

DETAILED DESCRIPTION OF THE PREFERRED EMBODIMENTS

Figure 1:
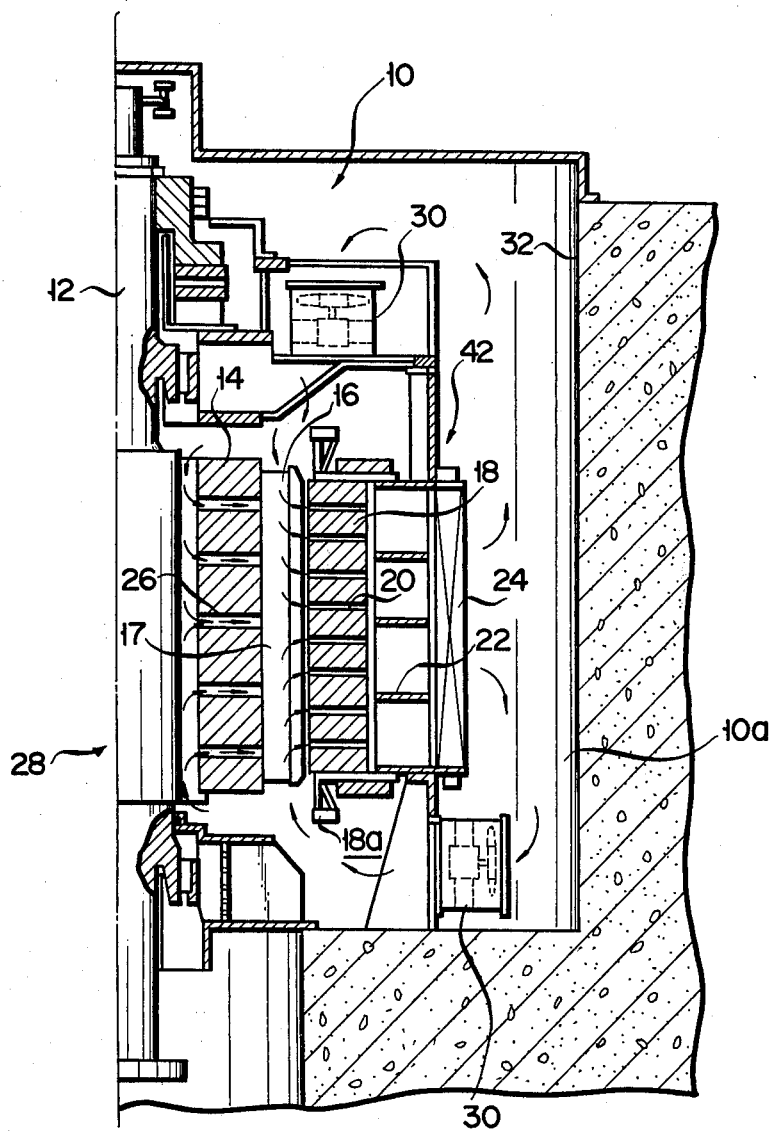
FIG. 1 is a longitudinally-sectioned view showing an example of conventional salient-pole type generator-motor in its right half.
Figure 3:
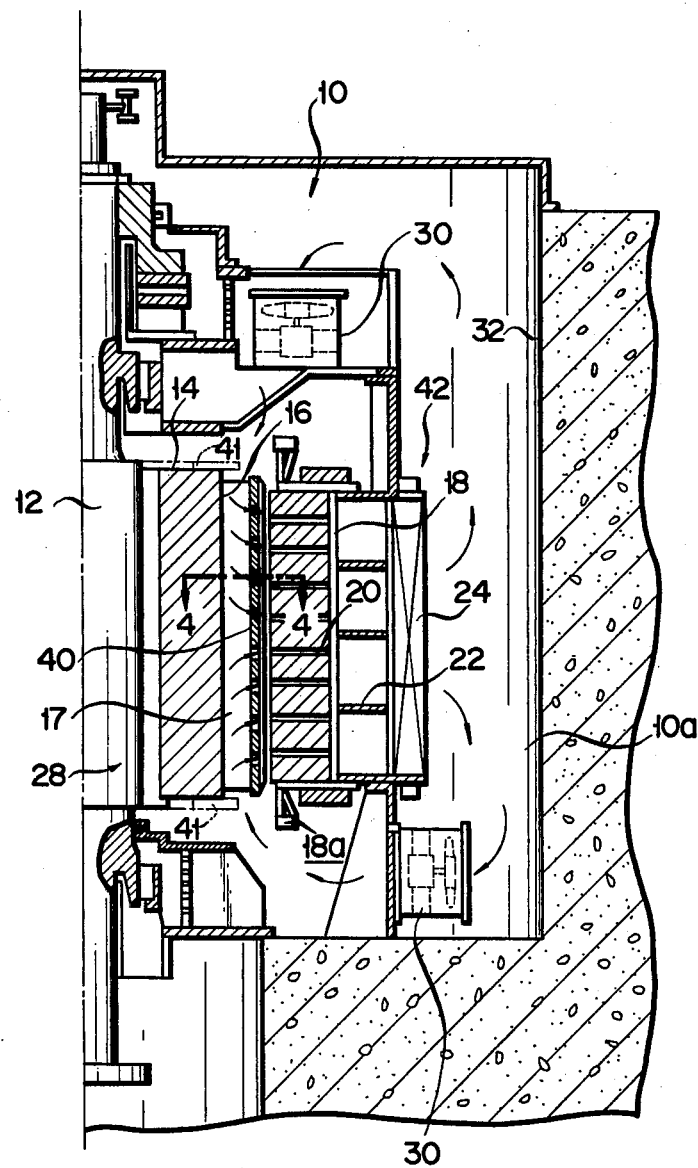
FIG. 3 is a longitudinally-sectional view showing an example of salient-pole type rotary machinery according to the present invention.

FIG. 3 is a longitudinal sectional view showing a generator-motor 10 which is an example of salient-pole type electir rotary machinery according to the present invention. The same parts as those in FIG. 1 are represented by the same reference numerals in FIG. 3. Ventilation limiting members i.e. ventilation limiting plates 40 each having a T-shaped section are arranged between magnetic poles 16 to limit cooling air flowing in the radial direction between magnetic poles 16. The ventilation limiting plate 40 is intended to reduce the fan effect attained thanks to the centrifugal force of rotor 28, but not to completely shut off air flowing in the radial direction between magnetic poles 16. Air allowed to further flow in the radial direction is employed to cool the rotor itself.

Figure 4:
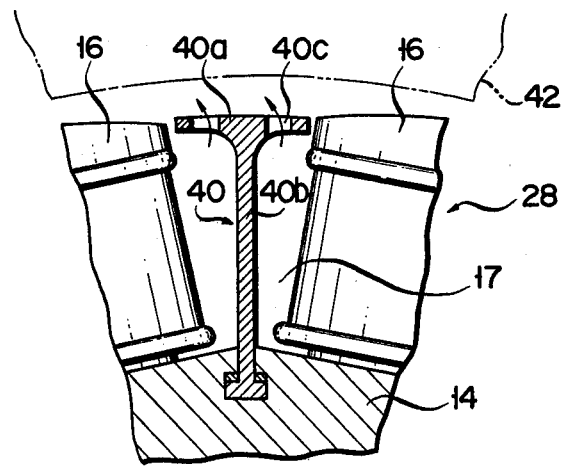
FIG. 4 is a partly-enlarged and sectioned view showing a ventilation limiting member employed in the rotary machinery in FIG. 3 and viewed in the axial direction.

FIG. 4 is a partly-enlarged sectional view taken along the line 4—4 and showing the ventilation limiting plate 40 arranged between magnetic poles 16. FIG. 4 is a view viewed in the axial direction of the generator-motor 10. The ventilation limiting plate 40 comprises a plate portion 40a arranged adjacent to the outer circumference of magnetic pole 16 to cover the space between magnetic poles 16, and an attaching arm 40b projected from the plate portion 40a toward the center of a rotor rim 14 with its foremost end fixed to the rotor rim 14. Ventilating openings 40c provided in the plate portion 40a serve to allow air to be left flowing through the space between magnetic poles 16 to cool the rotor. Numeral 42 in FIG. 4 represents a part of a stator cooperating with magnetic poles 16. It is usual that the rotor rim 14 of rotary generator-motor 10 according to the present invention is not provided with any of conventional rotor air ducts 26 shown in FIG. 1.

In the case of generator-motor 10 shown in FIG. 3, the driving force for forcing cooling air to be circulated is obtained from electric fans 30. Air flow caused by the fan effect which is attained by the rotation of rotor 28 is limited by ventilation limiting plates 40 to such an extent that is enough to cool the rotor 28, and then sent into a space between the rotor 28 and a stator core 18. After passing through an air cooler 24, the air flows through a space between the generator-motor 10 and a pit wall 32, allowing a part of it to enter into spaces 17 between magnetic poles of rotor 28 but most of it to pass through a clearance between the rotor 28 and the stator core 18 and then through stator air ducts 20 formed in the stator core 18. When it reaches the air cooler 24 after cooling the stator core 18 and a stator winding 18a, the air is cooled by the air cooler 24 and then sent into the space 10a to be further driven therein by the operation of electric fans 30. The air thus driven is again circulated through the rotary generator 10, achieving cooling effect.

Figure 2:
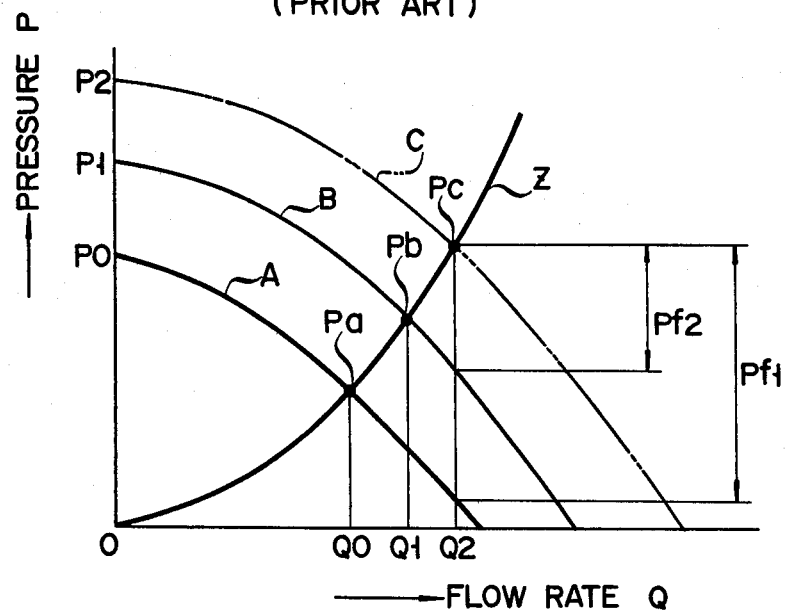
FIG. 2 is a graph showing the pressure-flow rate characteristic of cooling air attained in conventional an electric rotary machinery.
Figure 5:
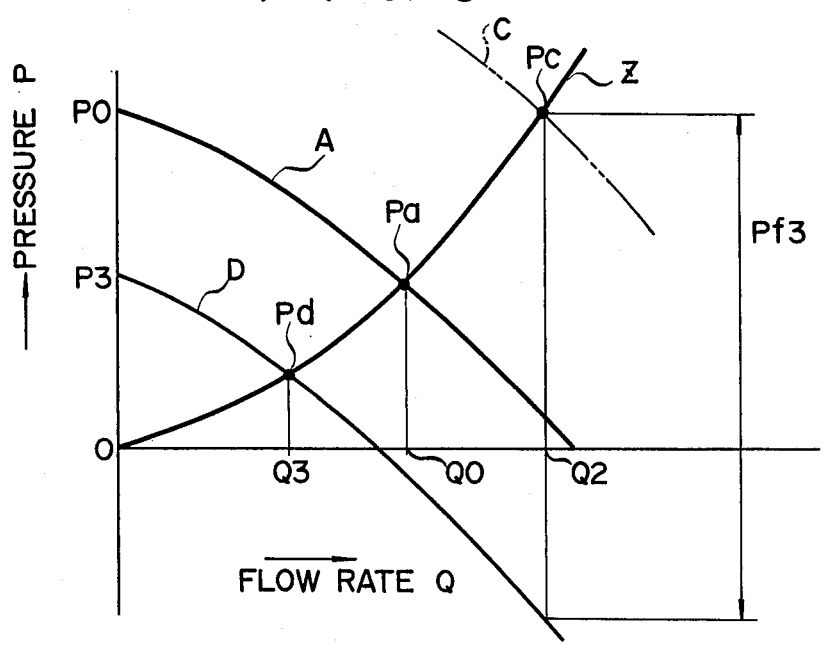
FIG. 5 is a graph showing pressure-flow rate curves of cooling air attained in the rotary machinery of FIG. 3.

FIG. 5 shows the relation between the pressure for driving the cooling air and the flow rate caused by the pressure in the above-described cooling process. The graph shown in FIG. 5 is similar to that shown in FIG. 2 and curves Z, A and C in FIG. 5 are also similar to those in FIG. 2. A curve D represents the fan effect attained by the rotor 28. Since ventilation limiting plates 40 are attached to the rotor 28, curve D is plotted lower than curve A in FIG. 2. The amount of flow rate by the rotor 28 reduces to $Q_3$ corresponding to a point Pd where curves D and Z intersect. The pressure which electric fans must bear to obtain a flow rate of cooling air having the flow rate $Q_2$ is $Pf_3$ and a power $Lf_3$ for driving electric fans 30 is represented by the following equation:

$$Lf_3 = \frac{Pf_3 \cdot Q_2}{\eta}$$

Power $Lf_3$ thus becomes larger than either of $Lf_1$ and $Lf_2$. However, wind loss $Lr_3$ of rotor 28 itself is reduced substantially and total power $L_3 (=Lr_3+Lf_3)$ necessary to achieve ventilation becomes lower than even $L_1$.

Figure 6:
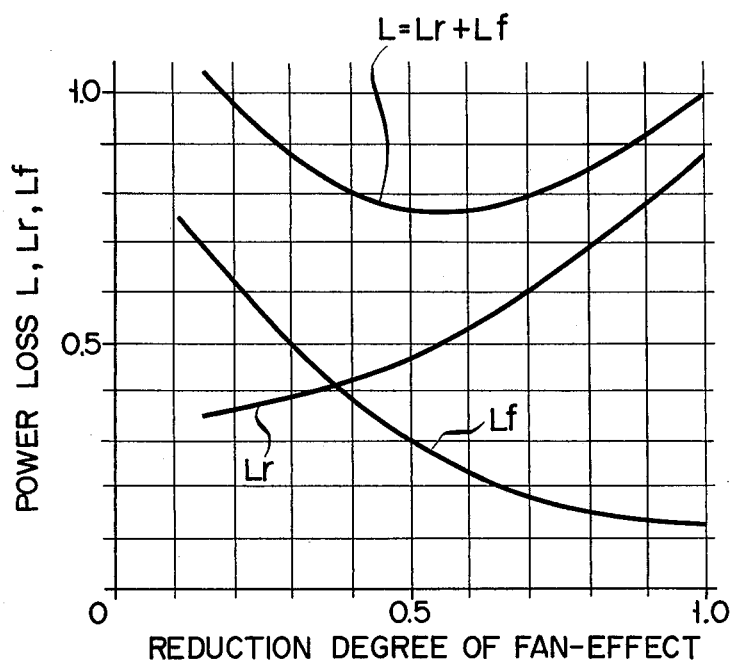
FIG. 6 is a graph showing the relation between the area of ventilating opening of limiting member in FIG. 4 and the power loss in the cooling air flow passage.

Since total power $L_3$ changes depending upon the ventilating area of openings 40c provided in ventilation limiting plates 40, it is necessary to select an appropriate ventilating area. FIG. 6 shows how total power L changes when the ventilating area of openings 40c is limited to reduce flow rate $Q_3$, said total power L representing the sum of power Lr needed for the fan effect of rotor 28 and power Lf for driving electric fans 30. The axis of abscissa represents the ratio between $Q_3$ and $Q_0$ of FIG. 5, that is, reduction degree $\alpha$ of fan effect, and L, Lf and Lr are plotted on the vertical axis of coordinates. When the fan effect of rotor 28 is limited, the value $\alpha$ of abscissa varies from 1.0 toward 0 and Lr reduces gradually while Lf increases gradually, but the total L becomes larger where $\alpha=1$ and $\alpha=0$, and becomes the smallest between these two values. It can be understood from the graph in FIG. 6 that total power L may be small when $\alpha$ is selected to range from 0.3 to 0.9.

Although an example of construction for reducing the fan effect of rotor 28 has been described, it may be a ring-shaped plate 41 arranged on both axial ends of magnetic pole 16 of rotor 28 and projected into the space 17 between magnetic poles 16. The ring-shaped plate 41 shown by two-dot and dash lines in FIG. 3 serves to limit air flowing into spaces 17 between magnetic poles 16 and then into stator air ducts 20 so as to reduce the fan effect of rotor 28. This ring-shaped plate 41 may also be used with ventilation limiting plate 40.

Figure 7:
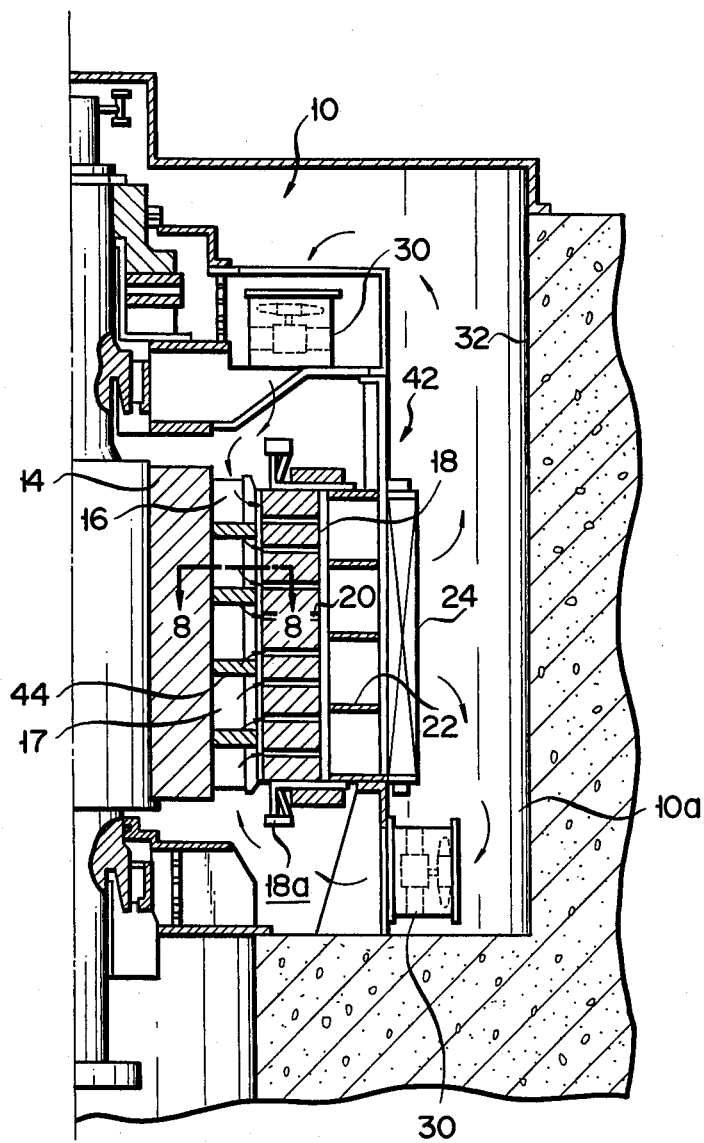
FIG. 7 is a longitudinally-sectioned view showing another example of rotary machinery according to the present invention.
Figure 8:
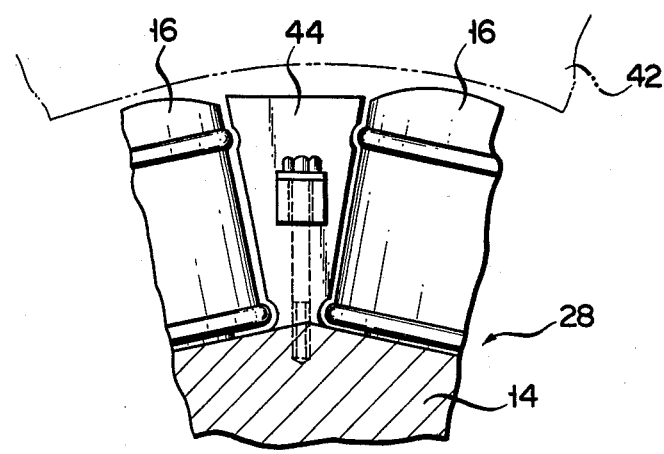
FIG. 8 shows a block-shaped limiting member inserted between magnetic poles in FIG. 7.
Figure 9:
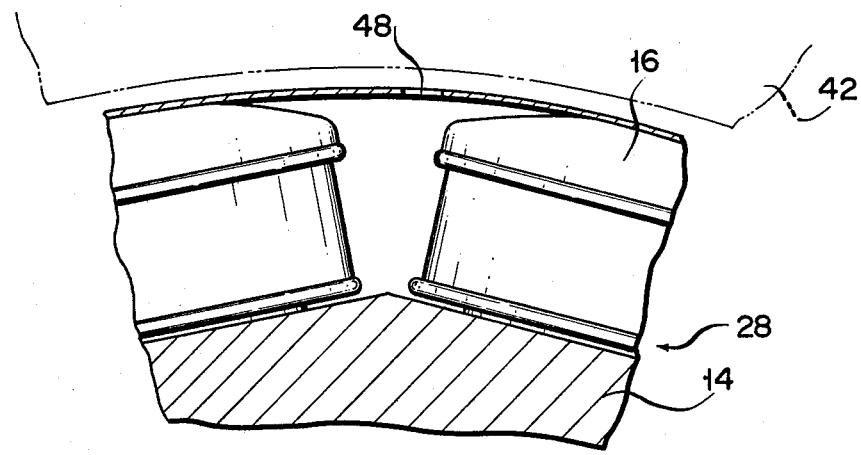
FIG. 9 shows a belt-shaped limiting member wound around the rotor.

FIGS. 7 and 8 show a plurality of block-shaped limiting members or spacer members 44 each being arranged in the space 17 between magnetic poles 16 and spaced axially from its adjacent ones. FIG. 8 shows one of spaces 17 between magnetic poles 16 viewed in the axial direction of generator-motor 10, and it can be understood from FIG. 8 that the spacer member 44 is arranged between magnetic poles 16. FIG. 9 shows a belt-shaped limiting member or outer circumferential cover 46 wound around the outer circumference of rotor 28 or outside the magnetic poles 16 to reduce the fan effect of rotor 28. Outer circumferential covers 46 are wound around magnetic poles 16 and spaced an appropriate distance from one another in the axial direction and may be provided with an appropriate number of ventilation openings 48 if necessary. Air in spaces 17 between magnetic poles is radially driven by the fan effect, but limited by clearances between outer circumferential covers 46 and by ventilation openings 48. A desired reduction degree $\alpha$ of fan effect can be thus attained by appropriately selecting number and area of clearances and ventilation openings 48.

As described above, the electric rotary machinery of salient-pole type according to the present invention enables the total power presumed for ventilation cooling to be kept small and a high efficient operation to be achieved.

Measured data will be shown to teach what effect can be achieved when the present invention is applied to the generator-motor of 335 MVA -429 rpm. When the conventional system shown in FIG. 1 was employed or air ducts were arranged in the rotor rim and six units of electric fans were used to obtain an amount of flow rate, about 80 m³/sec, in the generator-motor, input Lfz supplied to drive electric fans was 132 kw (=22 kw×6) and practically-measured value Lrz of wind loss caused by the rotor itself was 981 kw. Therefore, power loss $L_2$ totaled is 1113 kw. In the case of generator-motor to which the present invention was applied, twelve units of electric fans were employed and the input to electric fans was totaled to about 240 kw to obtain the flow rate of cooling wind, about 80 m³/sec, but wind loss $Lr_1$ caused by the rotor itself was rapidly reduced to 613 kw (practically-measured) and total power loss $L_1$ was reduced to 853 kw (equal to about 75% of $L_2$). As the result, an effect that the total power loss becomes 260 kw ($L_2-L_1$) smaller could be achieved.

What is claimed is:

1. An electric rotary machinery of the salient-pole type, comprising:
    a rotor including a rotor rim which does not have an air duct, and salient magnetic poles spaced from each other and mounted on an outer periphery of the rotor rim, wherein a fan effect of said magnetic poles axially drives air in said spaces and causes radial flow of air;
    a stator arranged to enclose said rotor and provided with radially arranged stator air ducts;
    an air circulating passage including said spaces between said magnetic poles, said stator air ducts and an outer circumferential air flowing passage formed around the outer circumference of said stator;
    electric fan means for driving air to circulate through said air circulating passage; and
    limiting members attached to said rotor to limit the fan effect of said magnetic poles, said limiting members being mounted to meet the relationship:

$$0.3 < \frac{Q_3}{Q_0} < 0.9$$

where, $Q_0$ is the amount of cooling air produced by the fan effect of the rotor provided with the rotor rim which does not have an air duct, and $Q_3$ is the amount of the cooling air in the case where the limiting members have been mounted, and said electric fan means having a capacity large enough to make up for the decreased amount of the cooling air caused by the limiting members.

2. The rotary machinery according to claim 1, wherein said limiting members are ventilation limiting plates attached to the outer circumference of said rotor between respective of said magnetic poles and provided with openings to limit the radial flow of air.

3. The rotary machinery according to claim 1, wherein said limiting members are a plurality of spacer members arranged in respective spaces between said magnetic poles and spaced axially from one another to partly fill said spaces.

4. The rotary machinery according to claim 1, wherein said limiting members are a plurality of belt members wound around the outer circumference of said rotor and axially spaced from one another, said belt member being made of high tension fibers.

* * * * *